(12) United States Patent  
Kehl et al.

(10) Patent No.: US 11,482,014 B2  
(45) Date of Patent: Oct. 25, 2022

(54) 3D AUTO-LABELING WITH STRUCTURAL AND PHYSICAL CONSTRAINTS

(71) Applicant: TOYOTA RESEARCH INSTITUTE, INC., Los Altos, CA (US)

(72) Inventors: Wadim Kehl, Mountain View, CA (US); Sergey Zakharov, Kirchseeon (DE); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 175 days.

(21) Appl. No.: 17/026,057

(22) Filed: Sep. 18, 2020

(65) Prior Publication Data

US 2021/0150231 A1 May 20, 2021

Related U.S. Application Data

(60) Provisional application No. 62/935,246, filed on Nov. 14, 2019.

(51) Int. Cl.
*G06V 20/58* (2022.01)
*G06T 7/70* (2017.01)
(Continued)

(52) U.S. Cl.
CPC ....... *G06V 20/584* (2022.01); *B60W 60/0027* (2020.02); *G01S 7/4802* (2013.01); *G01S 7/4808* (2013.01); *G01S 17/42* (2013.01); *G01S 17/89* (2013.01); *G06N 3/04* (2013.01); *G06N 3/08* (2013.01); *G06T 7/30* (2017.01); *G06T 7/70* (2017.01); *G06V 20/64* (2022.01); *B60W 2420/42* (2013.01); *B60W 2552/00* (2020.02); *B60W 2554/404* (2020.02); (Continued)

(58) Field of Classification Search
None
See application file for complete search history.

(56) References Cited

U.S. PATENT DOCUMENTS 10,540,572 B1   1/2020 Kim et al.
2008/0152193 A1* 6/2008 Takamori ......... G08B 13/19691
                                                    382/103
(Continued)

FOREIGN PATENT DOCUMENTS

WO        2017062635 A1    4/2017

OTHER PUBLICATIONS 2D to 3D Label Propagation for Object Detection in Point Cloud. Lertniphonphan et al. (Year: 2018).*

(Continued)

*Primary Examiner* — Delomia L Gilliard
(74) *Attorney, Agent, or Firm* — Seyfarth Shaw LLP

(57) ABSTRACT

A method for 3D auto-labeling of objects with predetermined structural and physical constraints includes identifying initial object-seeds for all frames from a given frame sequence of a scene. The method also includes refining each of the initial object-seeds over the 2D/3D data, while complying with the predetermined structural and physical constraints to auto-label 3D object vehicles within the scene. The method further includes linking the auto-label 3D object vehicles over time into trajectories while respecting the predetermined structural and physical constraints.

20 Claims, 9 Drawing Sheets

(51) Int. Cl.
- *B60W 60/00* (2020.01)
- *G06T 7/30* (2017.01)
- *G01S 7/48* (2006.01)
- *G01S 17/42* (2006.01)
- *G01S 17/89* (2020.01)
- *G06N 3/04* (2006.01)
- *G06N 3/08* (2006.01)
- *G06V 20/64* (2022.01)

(52) U.S. Cl.
CPC .............. *G06T 2207/10016* (2013.01); *G06T 2207/10028* (2013.01); *G06T 2207/20081* (2013.01); *G06T 2207/20084* (2013.01); *G06T 2207/30196* (2013.01); *G06T 2207/30241* (2013.01); *G06T 2207/30252* (2013.01)

(56) References Cited

U.S. PATENT DOCUMENTS

| | | | |
|---|---|---|---|
| 2010/0104199 A1* | 4/2010 | Zhang ................. | G06V 20/588 382/199 |
| 2015/0334371 A1* | 11/2015 | Galera ................. | G06V 20/56 348/46 |
| 2016/0042253 A1 | 2/2016 | Sawhney et al. | |
| 2016/0070986 A1 | 3/2016 | Chidlovskii et al. | |
| 2016/0091897 A1* | 3/2016 | Nilsson ............... | B60W 40/04 701/25 |
| 2018/0136332 A1 | 5/2018 | Barfield, Jr. et al. | |
| 2018/0341021 A1* | 11/2018 | Schmitt ............... | G01S 17/42 |
| 2019/0286153 A1* | 9/2019 | Rankawat ............ | G06T 7/11 |
| 2019/0311202 A1 | 10/2019 | Lee et al. | |
| 2019/0354745 A1 | 11/2019 | Lecerf | |
| 2020/0394458 A1* | 12/2020 | Yu ....................... | G06V 10/25 |
| 2021/0149022 A1* | 5/2021 | Kehl .................... | G01S 17/86 |

OTHER PUBLICATIONS

Vehicle Detection Techniques for Collision Avoidance Systems: A Review. Mukhtar et al. (Year: 2015).*
Zeng, et al., "Multi-view Self-supervised Deep Learning for 6D Pose Estimation in the Amazon Picking Challenge", International Conference on Robotics and Automation (ICRA) 2017, arXiv:1609.09475v3.
Zakharov, et al., "Autolabeling 3D Objects with Differentiable Rendering of SDF Shape Priors," Computer Vision and Pattern Recognition, arXiv:1911.11288v2, Apr. 2, 2020.
Chen, et al., "Beat the MTurkers: Automatic Image Labeling from Weak 3D Supervision," 2014 IEEE Conference on Computer Vision and Pattern Recognition, Columbus, OH, 2014, pp. 3198-3205.
Piewak, et al., "Boosting LiDAR-based Semantic Labeling by Cross-Modal Training Data Generation," Computer Vision—ECCV 2018 Workshops. ECCV 2018. Lecture Notes in Computer Science, vol. 11134. Springer, Cham.
Engelmann, et al., "SAMP: Shape and Motion Priors for 4D Vehicle Reconstruction", Computer Vision and Pattern Recognition, arXiv:2005.00922v1, May 2, 2020.
Zimmer, et al., "3D BAT: A Semi-Automatic, Web-based 3D Annotation Toolbox for Full-Surround, Multi-Modal Data Streams", Computer Vision and Pattern Recognition, arXiv:1905.00525v1, May 1, 2020.

* cited by examiner us
3D AUTO-LABELING WITH STRUCTURAL AND PHYSICAL CONSTRAINTS

CROSS-REFERENCE TO RELATED APPLICATION

The present application claims the benefit of U.S. Provisional Patent Application No. 62/935,246, filed on Nov. 14, 2019, and titled "AUTOLABELING 3D OBJECTS WITH DIFFERENTIABLE RENDERING OF SDF SHAPE PRIORS," the disclosure of which is expressly incorporated by reference in its entirety.

BACKGROUND

Field

Certain aspects of the present disclosure generally relate to machine learning and, more particularly, 3D auto-labeling of objects bound by structural and physical constraints.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained deep neural network (DNN) to identify objects within areas of interest in an image of a surrounding scene of the autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. In particular, the DNN may be trained to understand a scene from a video input based on annotations of automobiles within the scene. Unfortunately, annotating video is a challenging task involving deep understanding of visual scenes.

SUMMARY

A method for 3D auto-labeling of objects with predetermined structural and physical constraints includes identifying initial object-seeds for all frames from a given frame sequence of a scene. The method also includes refining each of the initial object-seeds over the 2D/3D data, while complying with the predetermined structural and physical constraints to auto-label 3D object vehicles within the scene. The method further includes linking the auto-label 3D object vehicles over time into trajectories while respecting the predetermined structural and physical constraints.

A non-transitory computer-readable medium having program code recorded thereon for 3D auto-labeling of objects with predetermined structural and physical constraints, in which the program code is executed by a processor. The non-transitory computer-readable medium includes program code to identify initial object-seeds for all frames from a given frame sequence of a scene. The non-transitory computer-readable medium also includes program code to refine each of the initial object-seeds over the 2D/3D data, while complying with the predetermined structural and physical constraints to auto-label 3D object vehicles within the scene. The non-transitory computer-readable medium further includes program code to link the auto-label 3D object vehicles over time into trajectories while respecting the predetermined structural and physical constraints.

A system for 3D auto-labeling of objects with predetermined structural and physical constraints includes an object-seed detection module. The object-seed detection module trained to identify initial object-seeds for all frames from a given frame sequence of a scene. The system also includes an object-seed refinement module. The object-seed refinement module is trained to refine each of the initial object-seeds over the 2D/3D data, while complying with the predetermined structural and physical constraints to auto-label 3D object vehicles within the scene. The system further includes a 3D auto-labeling module. 3D auto-labeling module is trained to link the auto-label 3D object vehicles over time into trajectories while respecting the predetermined structural and physical constraints.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
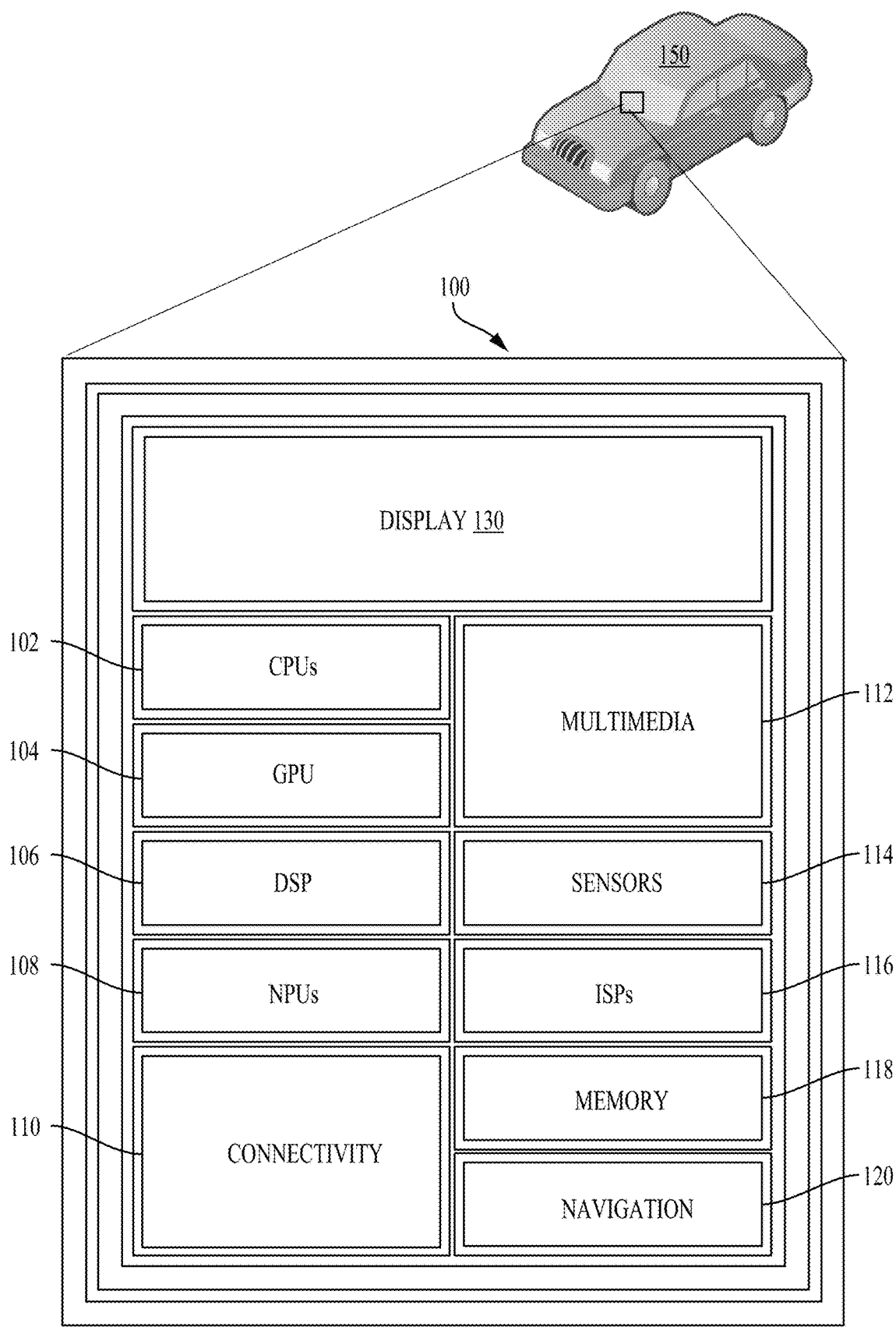
FIG. 1 illustrates an example implementation of designing a system using a system-on-a-chip (SOC) for 3D auto-labeling with structural and physical constraints, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Deep learning often involves large labeled datasets to reach state-of-the-art performance. In the context of three-dimensional (3D) object detection for autonomous vehicles and other robotics applications, 3D cuboids are one annotation type because they allow for proper reasoning over all nine degrees of freedom (three degrees of freedom for each instance of location, orientation, and metric extent). Unfortunately, acquiring enough labels to train 3D object detectors can be laborious and costly, as it mostly relies on a large number of human annotators. Conventional approaches to scaling up annotation pipelines include better tooling, active learning, or a combination thereof. These approaches often rely on heuristics and involve humans in the loop to correct the semi-automatic labeling, especially for difficult edge cases.

In particular, conventional methods in the domain of deep learning are strongly reliant on supervised training regimes. While they can provide for immediate learning of mappings from input to output, supervision involves large amounts of annotated datasets to accomplish the task. Unfortunately, acquiring these annotated datasets is laborious and costly. Additionally, the cost of annotating varies greatly with the annotation type because 2D bounding boxes are much cheaper and faster to annotate than, for example, instance segmentations or cuboids.

Aspects of the present disclosure provide an improvement over the conventional annotation methods by using several different priors for auto-labeling objects (e.g., vehicles and non-vehicles). These priors include things such as the vehicles are located on the ground, vehicles cannot penetrate other vehicles, vehicles have four wheels, etc. This aspect of the present disclosure effectively uses shape priors to auto-label objects. The shape priors include certain constraints, including that the vehicle is rigid, the vehicle should be located on the ground, and the vehicle cannot penetrate another vehicle.

One aspect of the present disclosure provides an improved three-dimensional (3D) annotation and object-detection system by relying on differentiable rendering of shape priors. In this aspect of the present disclosure, differentiable rendering of shape priors enables recovery of metric scale, pose, and shape of objects (e.g., vehicles, in the case of an autonomous-driving system) in the wild. In one configuration, a 3D auto-labeling pipeline specifies, as input, 2D detections (e.g., bounding boxes or instance masks) and sparse LIDAR point clouds. LIDAR point clouds are now ubiquitous in 3D robotics applications. In fact, the object detections themselves can even be produced by off-the-shelf 2D object detectors. These configurations demonstrate that differentiable visual alignment (e.g., also known as "analysis-by-synthesis" or "render-and-compare") is an effective approach to auto-labeling. That is, differentiable visual alignment provides an effective approach for applications such as autonomous driving and other 3D robotics applications, including humanoid robots.

One configuration of the 3D annotation and object-detection system includes a continuously traversable coordinate shape-space (CSS) that combines a signed-distance-field (SDF) shape-space (e.g., a "DeepSDF" shape-space framework) with normalized object coordinates (NOCS). This combination makes it possible to set object shapes into correspondence, which facilitates deformable shape matching. The 3D annotation and object-detection system employ a differentiable SDF renderer for comparative scene analysis over a defined shape-space. In addition, the 3D annotation and object-detection system includes a learning curriculum for an auto-labeling pipeline that begins with synthetic data (e.g., computer-aided design (CAD) models of vehicles and driving scenes, in an autonomous-driving context). In one configuration, the auto-labeling pipeline mixes synthetic and real data in subsequent training loops, and progressively increases the difficulty level of the input data throughout the training loops.

In some configurations, the auto-labeling pipeline begins with a CSS neural network trained to predict a 2D NOCS map, as well as a shape vector, from an image patch. To bootstrap an initial version, the CSS network is trained using synthetic data for which ground-truth NOCS and shape-vector targets are easily acquired, and augmentations are also applied to minimize a domain gap (e.g., sim2real). In these configurations, the auto-labeling loop includes (1) leveraging 2D annotations to localize instances, (2) running the CSS network on an extracted patch of an input image, (3) re-projecting NOCS into the scene via LIDAR, (4) recovering an object model from the CSS, (5) computing an approximate pose via 3D-3D correspondences, and (6) running projective and geometric alignment for refinement of the initial estimate.

After processing the images in the training set, recovered auto-labels are harvested, and the CSS prediction network is retrained to gradually expand into a new domain. The process is then repeated to get increasingly better CSS predictions and, in turn, better auto-labels (e.g., 3D cuboid bounding boxes) for objects. To avoid drifting with noisy auto-labels, a training curriculum is employed that focuses on easy samples first and increases the difficulty level with each pass through the training loop. In aspects of the present disclosure, annotation (e.g., auto-labeling) of vehicles is performed at no cost by leveraging strong priors such as car shapes, metrical size, road topology, maps, and other like shape prior information.

The present disclosure expands the use of shape priors to perform auto-labeling. As described, a "shape prior" is information known about the shape of objects in advance. For example, the shape prior information may recognize that vehicles should have a rigid shape. This shape prior information may be expanded to improve the accuracy of auto labeling. For example, the shape priors may include the following information, such as the vehicles should have four or more wheels, the vehicles should be located on the ground, and the vehicles should not penetrate each other.

In one aspect of the present disclosure, a method for auto-labeling 3D objects includes identifying, by an object detector using 2D/3D data, initial object-seeds for all frames from a given frame sequence of a scene. For example, the object-seeds are objects that may be vehicles, but are also non-vehicle objects. Once identified, an optimization procedure refines each initial seed over the 2D/3D information, while respecting map and road constraints. This portion of the method involves the "shape prior." In this portion of the process, additional shape prior information, including that vehicles should have wheels, must be located on the ground, and do not penetrate each other is used. Another optimization links the 3D objects over time, creating smooth trajectories while respecting the road and physical boundaries.

FIG. 1 illustrates an example implementation of the aforementioned system and method for 3D auto-labeling with structural and physical constraints using a system-on-a-chip (SOC) 100 of an ego vehicle 150. The SOC 100 may include a single processor or multi-core processors (e.g., a central processing unit), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for 3D auto-labeling with structural and physical constraints of objects (e.g., vehicle and non-vehicle objects) within an image captured by the sensor processor 114. The instructions loaded into a processor (e.g., CPU 102) may also include code for planning and control (e.g., of the ego vehicle) in response to linking the 3D objects over time, creating smooth trajectories while respecting the road and physical boundaries from images captured by the sensor processor 114.

The instructions loaded into a processor (e.g., CPU 102) may also include code to identify initial object-seeds for all frames from a given frame sequence of a scene. The instructions loaded into a processor (e.g., CPU 102) may also include code to refine each of the initial object-seeds over the 2D/3D data, while complying with predetermined structural and physical constraints to auto-label 3D object vehicles within the scene. The instructions loaded into a processor (e.g., CPU 102) may further include code to link the auto-label 3D object vehicles over time into trajectories while respecting the predetermined structural and physical constraints.

Figure 2:
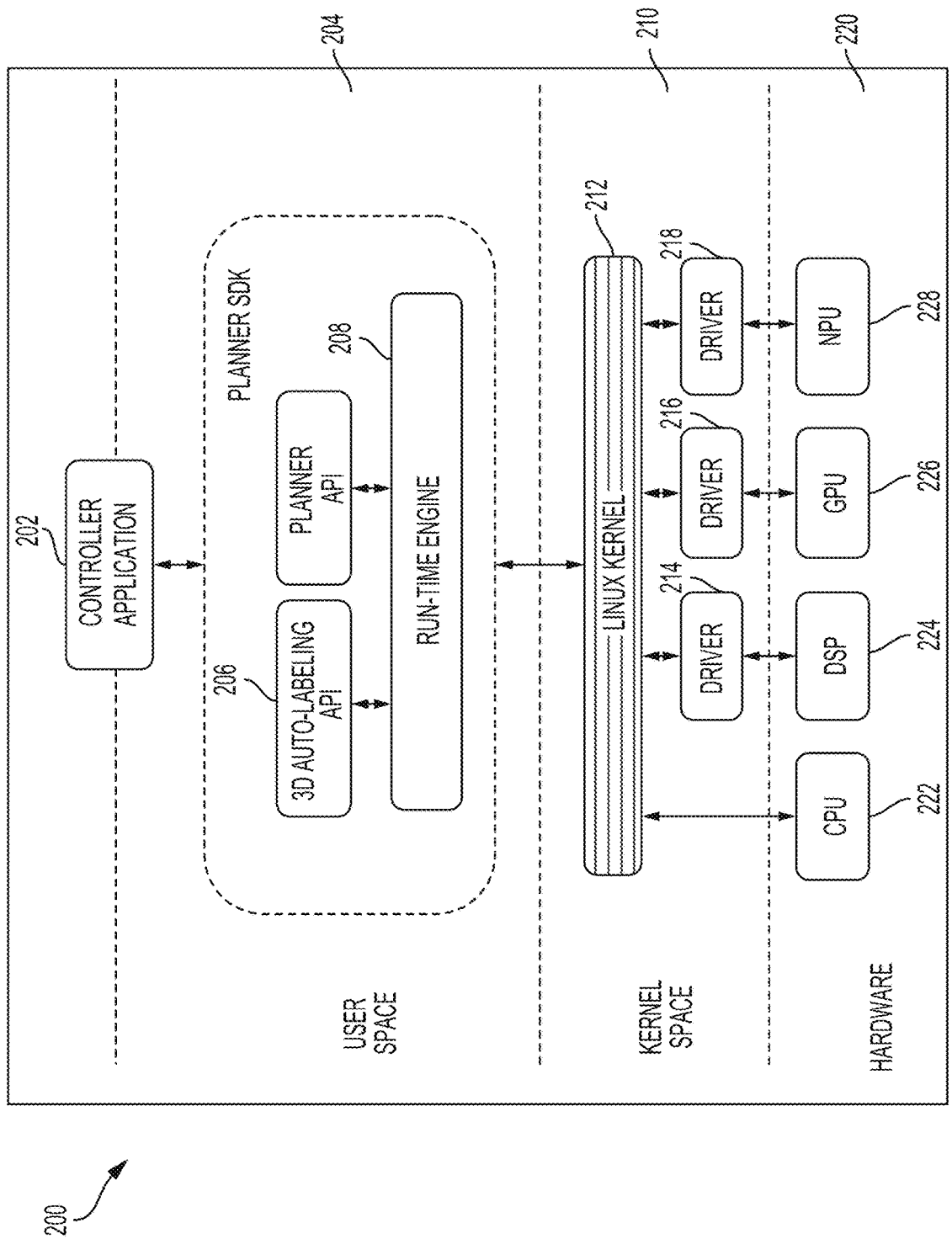
FIG. 2 is a block diagram illustrating a software architecture that may modularize functions for 3D auto-labeling with structural and physical constraints, according to aspects of the present disclosure.

FIG. 2 is a block diagram illustrating a software architecture 200 that may modularize functions for planning and control of an ego vehicle using a 3D auto-labeling system with structural and physical constraints, according to aspects of the present disclosure. Using the architecture, a controller application 202 may be designed such that it may cause various processing blocks of an SOC 220 (for example a CPU 222, a DSP 224, a GPU 226, and/or an NPU 228) to perform supporting computations during run-time operation of the controller application 202.

The controller application 202 may be configured to call functions defined in a user space 204 that may, for example, analyze a scene in a video captured by a monocular camera of an ego vehicle based on 3D auto-labeling of objects in the scene. In aspects of the present disclosure, 3D auto-labeling of objects (e.g., vehicle and non-vehicle objects) of the video is improved by using structural and physical constraints as shape priors. The controller application 202 may make a request to compile program code associated with a library defined in a 3D auto-labeling application programming interface (API) 206 to label vehicles within a scene of a video captured by the monocular camera of the ego vehicle using structural and physical constraints as shape priors.

A run-time engine 208, which may be compiled code of a run-time framework, may be further accessible to the controller application 202. The controller application 202 may cause the run-time engine 208, for example, to perform monocular (single-camera) 3D detection and auto-labeling. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
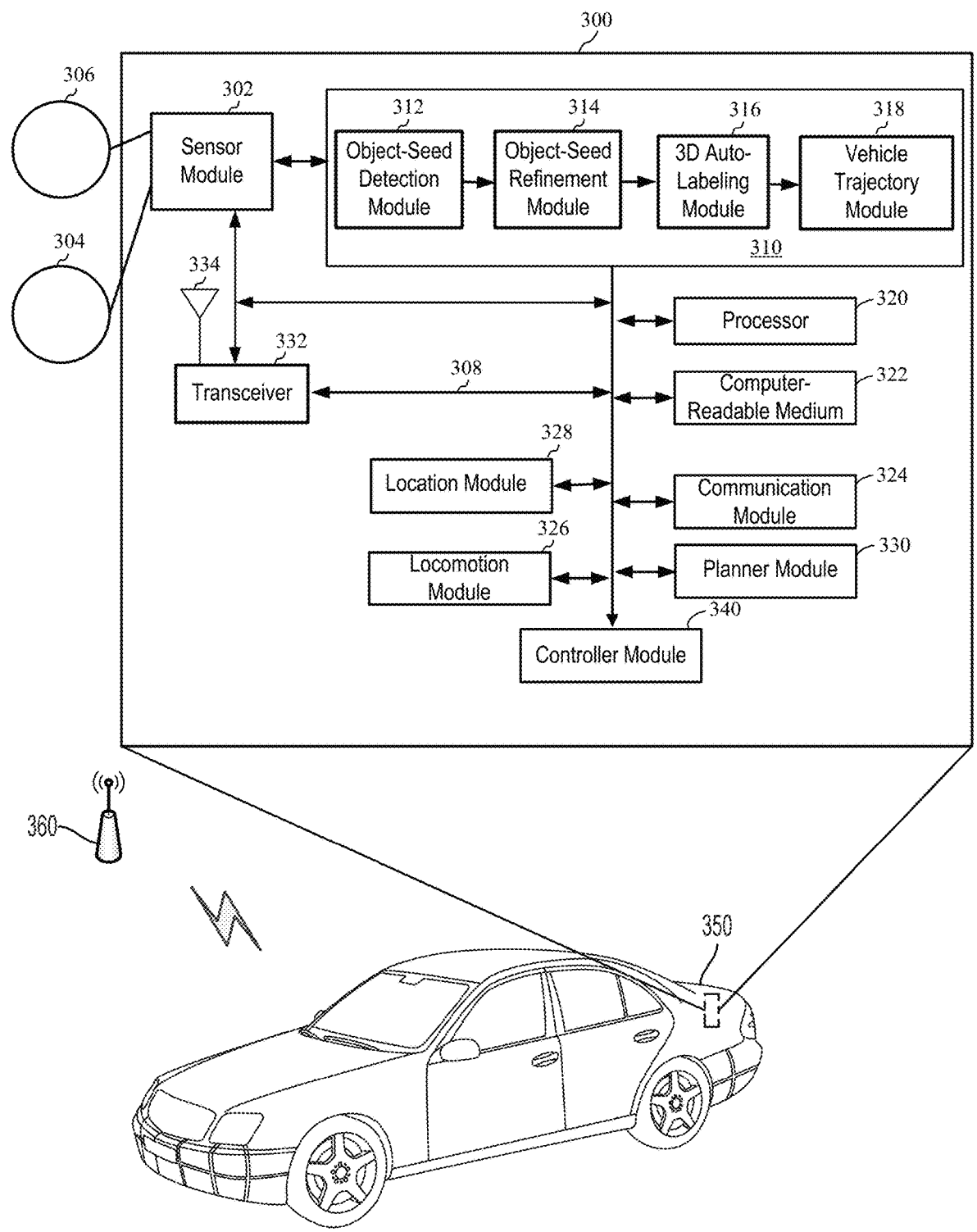
FIG. 3 is a diagram illustrating an example of a hardware implementation for a 3D auto-labeling system with structural and physical constraints, according to aspects of the present disclosure.

FIG. 3 is a diagram illustrating an example of a hardware implementation for a 3D auto-labeling system 300 using structural and physical constraints as shape priors, according to aspects of the present disclosure. The 3D auto-labeling system 300 may be configured for understanding a scene to enable planning and controlling an ego vehicle in response to images from video captured through a camera during operation of a car 350. The 3D auto-labeling system 300 may be a component of a vehicle, a robotic device, or other device. For example, as shown in FIG. 3, the 3D auto-labeling system 300 is a component of the car 350. Aspects of the present disclosure are not limited to the 3D auto-labeling system 300 being a component of the car 350, as other devices, such as a bus, motorcycle, or other like vehicle, are also contemplated for using the 3D auto-labeling system 300. The car 350 may be autonomous or semi-autonomous.

The 3D auto-labeling system 300 may be implemented with an interconnected architecture, represented generally by an interconnect 308. The interconnect 308 may include any number of point-to-point interconnects, buses, and/or bridges depending on the specific application of the 3D auto-labeling system 300 and the overall design constraints of the car 350. The interconnect 308 links together various circuits, including one or more processors and/or hardware modules, represented by a sensor module 302, a vehicle perception module 310, a processor 320, a computer-readable medium 322, a communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The 3D auto-labeling system 300 includes a transceiver 332 coupled to the sensor module 302, the vehicle perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit auto-labeled 3D objects within a video and/or planned actions from the vehicle perception module 310 to a server (not shown).

The 3D auto-labeling system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the 3D auto-labeling system 300 to perform the various functions described for ego vehicle perception of auto-labeled scenes within video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the vehicle perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

Understanding a scene from a video input based on auto-labeling of 3D objects within a scene is an important perception task in the area of autonomous driving, such as the car 350. The present disclosure expands the use of shape priors to perform auto-labeling. As described, a "shape prior" is information known about the shape of objects in advance. For example, the shape prior information may recognize that vehicles should have a rigid shape. This shape prior information may be expanded to improve the accuracy of auto labeling. For example, the shape priors may include the following information, such as that the vehicles should have four or more wheels, the vehicles should be located on the ground, and the vehicles should not penetrate each other. In aspects of the present disclosure, annotation (e.g., auto-labeling) of vehicles is performed at no cost by leveraging strong priors such as car shapes, metrical size, road topology, maps, and other like structural and physical shape prior constraints.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the car 350 parking space. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), 3G, etc. The communication module 324 may also communicate with other components of the car 350 that are not modules of the 3D auto-labeling system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The 3D auto-labeling system 300 also includes the planner module 330 for planning a selected trajectory to perform a route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The vehicle perception module 310 may be in communication with the sensor module 302, the processor 320, the computer-readable medium 322, the communication module 324, the locomotion module 326, the location module 328, the planner module 330, the transceiver 332, and the controller module 340. In one configuration, the vehicle perception module 310 receives sensor data from the sensor module 302. The sensor module 302 may receive the sensor data from the first sensor 304 and the second sensor 306. According to aspects of the present disclosure, the vehicle perception module 310 may receive sensor data directly from the first sensor 304 or the second sensor 306 to perform 3D auto-labeling of vehicle and non-vehicle objects from images captured by the first sensor 304 or the second sensor 306 of the car 350.

As shown in FIG. 3, the vehicle perception module 310 includes an object-seed detection module 312, an object-seed refinement module 314, a 3D auto-labeling module 316, and a vehicle trajectory module 318 (e.g., based on video auto-labels). The object-seed detection module 312, the object-seed refinement module 314, the 3D auto-labeling module 316, and the vehicle trajectory module 318 may be components of a same or different artificial neural network, such as a deep neural network (DNN). An object-seed model of the object-seed detection module 312 and/or the object-seed refinement module 314 is not limited to a deep neural network. In operation, the vehicle perception module 310 receives a data stream from the first sensor 304 and/or the second sensor 306. The data stream may include a 2D RGB image from the first sensor 304 and LIDAR data points from the second sensor 306. The data stream may include multiple frames, such as image frames. In this configuration, the first sensor 304 captures monocular (single camera) 2D RGB images.

The vehicle perception module 310 is configured to understand a scene from a video input (e.g., the sensor module) based on 3D auto-labels describing objects (e.g., vehicles) within the scene as a perception task during autonomous driving of the car 350. Aspects of the present disclosure are directed to a method for auto-labeling 3D objects including identifying, by the object-seed detection module 312, initial object-seeds for all frames from a given frame sequence of a scene. For example, the object-seeds are objects that may be vehicles, but are also non-vehicle objects. Once identified, the object-seed refinement module 314 performs an optimization procedure to refine each initial seed over 2D/3D information, while respecting physical and structural constraints (e.g., map and road constraints).

In aspects of the present disclosure, this portion of the 3D auto-labeling method involves physical and structural shape prior constraints. In this portion of the process, additional shape prior information including that a vehicle should have wheels, must be located on the ground, and not penetrate another are applied. The 3D auto-labeling module completes the labeling of the 3D vehicle and non-vehicle objects. Another optimization is provided by the vehicle trajectory module 318, which links the 3D objects over time, creating smooth trajectories while respecting the road and physical boundaries, for example, as shown in FIG. 4.

Overview of 3D Auto-Labeling Pipeline

Figure 4:
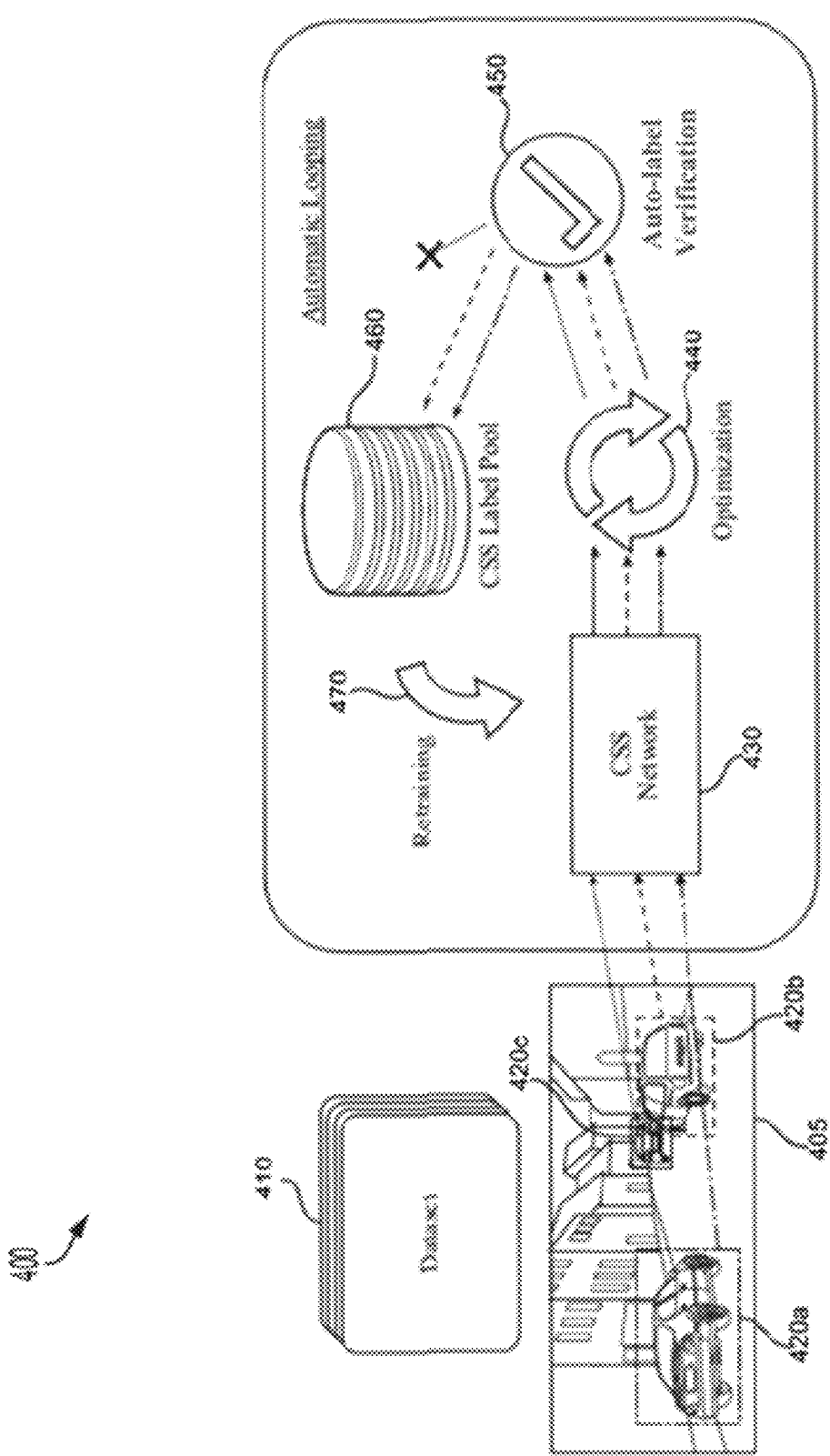
FIG. 4 is a block diagram of a 3D auto-labeling pipeline for the 3D auto-labeling system of FIG. 3, according to aspects of the present disclosure.

FIG. 4 is a block diagram of a 3D auto-labeling pipeline 400 for the 3D auto-labeling system 300, in accordance with an illustrative configuration of the present disclosure. In FIG. 4, a dataset 410 potentially includes both real image and LIDAR data and synthetic input data. As described, the synthetic input data can include computer-rendered driving scenes and CAD models of different types of vehicles with ground-truth annotations. In these configurations, the synthetic input data is used for training a coordinate shape-space (CSS) network 430. In the example of FIG. 4, a 2D object detector (e.g., the vehicle perception module 310 of FIG. 3) has detected three vehicles in an input image 405 and has labeled them, respectively, with a 2D label 420a, a 2D label 420b, and a 2D label 420c. In this example, the 2D labels are 2D bounding boxes. The vehicle perception module 310 inputs the 2D label 420a, the 2D label 420b, and the 2D label 420c to the CSS network 430.

In this aspect of the present disclosure, for each 2D-labeled object, the vehicle perception module 310 produces a 2D normalized object coordinates (NOCS) image and a shape vector. The vehicle perception module 310 decodes the 2D NOCS image and the shape vector to an object model in the CSS network 430 (e.g., continuously traversable CSS network). The vehicle perception module 310 then back-projects, in a frustum, the 2D NOCS image to a corresponding LIDAR point cloud. The vehicle perception module 310 also identifies one or more correspondences between the LIDAR point cloud and the object model to produce an initial estimate of an affine transformation between the LIDAR point cloud and the object model.

In this aspect of the present disclosure, the object-seed refinement module 314 performs an optimization process 440, which involves iteratively refining the estimate of the affine transformation via differentiable geometric and visual alignment using a differentiable signed-distance-field (SDF) renderer. The 3D auto-labeling module 316 can then perform an auto-label verification process 450 to discard obviously incorrect auto-labels before harvesting them into the CSS label pool 460. Once all of the frames have been processed in a particular training loop, the CSS network 430 can be retrained (retraining 470 in FIG. 4), and the next training loop over the dataset 410 can begin. Various aspects of the 3D auto-labeling pipeline 400 are discussed in further detail in connection with FIGS. 5A-8 below.

Coordinate Shape-Space (CSS)

These configurations employ a coordinate-space framework known in the literature as "DeepSDF" to embed (watertight) vehicle models into a joint, compact shape-space representation with a single neural network (e.g., the CSS network 430). The concept is to transform input models into SDFs where each value signifies the distance to the closest surface, with positive and negative values representing exterior and interior regions, respectively. The SDF representation is desirable because it is generally easy for a neural network to learn. Eventually, the DeepSDF forms a shape-space of implicit surfaces with a decoder that can be queried at spatially-continuous 3D locations $x=\{x_1, \ldots, x_N\}$ with a provided latent code z (the shape vector discussed above) to retrieve SDF values $s=\{s_1, \ldots, s_N\}:f(x;z)=s$.

To facilitate approximate deformable shape matching, these configurations combine the shape-space with NOCS to form a continuously traversable CSS, as discussed above. To that end, these configurations resize the models to unit diameter and interpret 3D coordinates of the 0-level set as dense surface descriptions.

To train the function $f$ these configurations use synthetic input data, including multiple CAD models of vehicles, as well as rendered traffic scenes with accompanying ground-truth labels. These configurations follow the original Deep-SDF approach to training, but the latent vectors (e.g., shape vectors) are projected onto the unit sphere after each iteration (e.g., after each pass through the training loop). In the CSS, each vehicle corresponds to a single shape vector. For example, (0,1,1) might be an SUV, (0,1,0) might be a convertible, and (0,0,1) might be a Porsche®. The vectors are continuous, meaning that the CSS is continuously traversed from one vehicle to another (as if one vehicle "morphs" into another as the shape-space is traversed). In these configurations, the CSS is three dimensional, but in other configurations it is possible to have a shape-space of a different dimensionality.

Differentiable SDF Rendering

One component of the 3D auto-labeling pipeline 400 is the ability to optimize objects regarding prose, scale, and shape. These functions are performed by the object-seed refinement module 314, as discussed above. To that end, these configurations include a differentiable SDF renderer. This differentiable SDF renderer avoids mesh-related problems, such as connectivity or intersections, and includes a different way of sampling the representation. These configurations also employ an alternative formulation for rendering implicit surfaces that lends itself to back-propagation.

One aspect of the differentiable SDF renderer is the projection of a 0-isosurface. Provided with query points $x_i$ and associated signed-distance values $s_i$, these configurations include a differentiable way to access the implicit surface. Simply selecting query points based on their signed-distance values does not form a derivative with respect to the latent vector. Moreover, the regularly sampled locations are approximately on the surface. These configurations exploit the property that deriving the SDF with respect to its location yields the normal at this point, practically computed with a backward pass:

$$n_j = \frac{\partial f(x_i; z)}{\partial x_i}.$$

Because normals provide the direction to the closest surface and signed-distance values provide the exact distance. In this example, the query location can be projected onto a 3D surface position $p_i$:

$$p_i = x_i - \frac{\partial f(x_i; z)}{\partial x_i} f(x_i; z)$$

To get clean surface projections, these configurations disregard all points $x_i$ outside a narrow band ($\|s_i\|>0.03$) of the surface. A schematic explanation is provided in FIGS. 5A-5C.

Figures 5A, 5B, 5C:
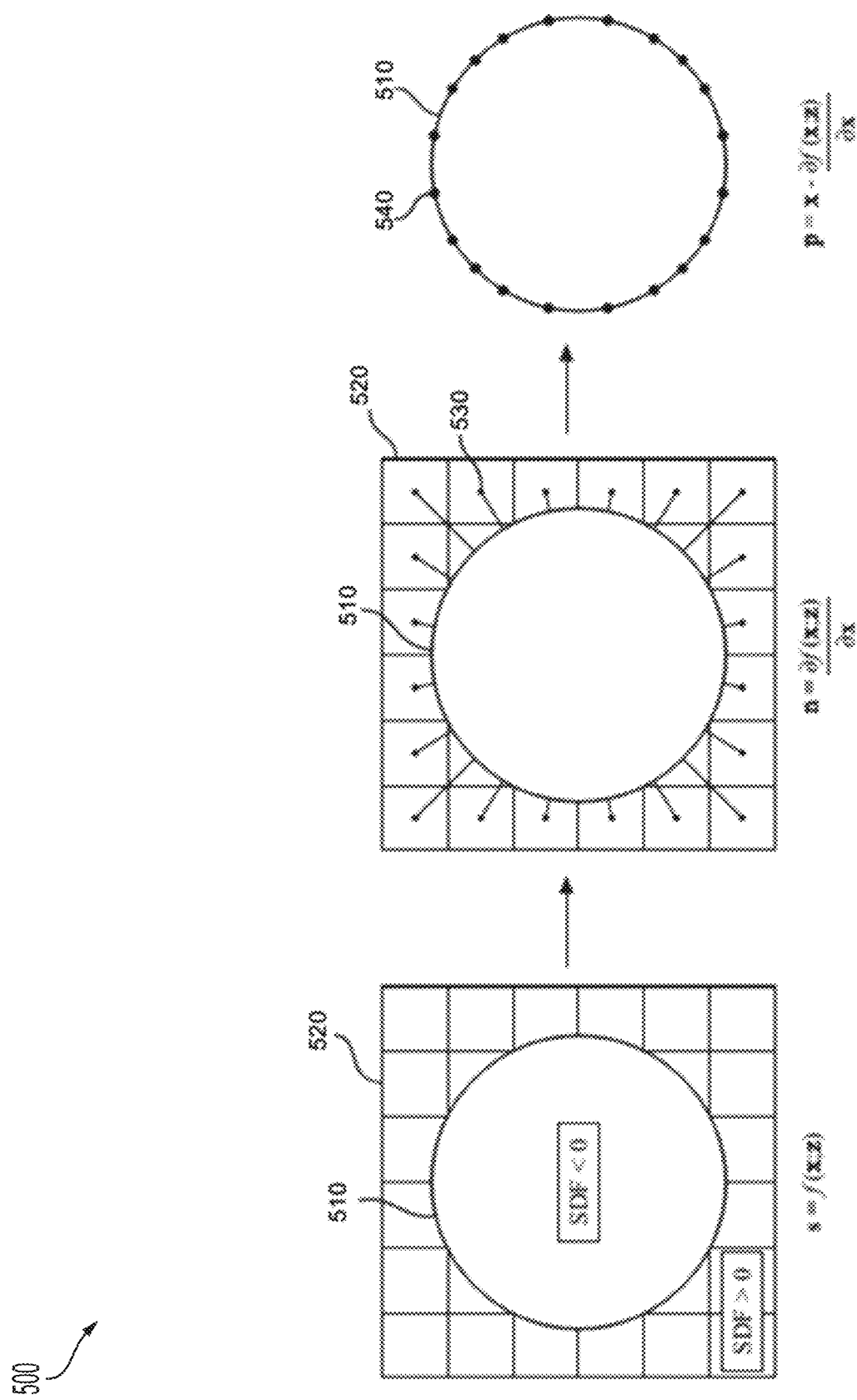
FIGS. 5A-5C illustrate surface projection of an object using signed-distance-fields (SDFs), according to aspects of the present disclosure.

FIGS. 5A-5C illustrate the surface projection 500 of an object using SDFs, in accordance with an illustrative configuration of the present disclosure. FIG. 5A illustrates an object surface 510 within a query grid 520. As indicated in FIG. 5A, locations interior to object surface 510 have negative SDF values, and those exterior to object surface 510 have positive SDF values. FIG. 5B illustrates the normals for points 530 exterior to object surface 510. FIG. 5C illustrates the projected object-surface points 540 that lie on object surface 510.

Another aspect of the differentiable SDF renderer is the use of surface tangent disks. In the field of computer graphics, the concept of surface elements (surfels) is a well-established alternative to connected triangular primitives. The differentiable SDF representation in these configurations yields oriented points and can be immediately used to render surface disks. To obtain a watertight surface, disk diameters are selected that are large enough to close holes. The surface discs can be constructed as follows:

1. Given the normal of a projected point $$n_i = \frac{\partial f(p_i; z)}{\partial p_i},$$

estimate the 3D coordinates of the resulting tangent plane visible in the screen. The distance d of the plane to each 2D pixel (u, v) can be computed by solving a system of linear equations for the plane and camera projection, resulting in the following solution:

$$d = \frac{n_t \cdot p_i}{n_i \cdot K^{-1} \cdot (u, v, 1)^T},$$

where $K^{-1}$ is the inverse camera matrix, followed by back-projection to get the final 3D plane coordinate: $P=K^{-1}\cdot(u\ d, v\cdot d, d)^T$.

2. Estimate the distance between the plane vertex and surface point and clamp, if it is larger than the disc diameter: $M=\max(\text{diam}-\|p_i-P\|_2, 0)$. To ensure watertightness, the diameter from the query location density is computed: $\text{diam}=\min_{1\neq j}\|x_i-x_j\|_2\sqrt{3}$. Performing the foregoing calculations for each pixel yields a depth map $D_i$ and a tangential distance mask $M_i$ at point $p_i$.

3D Auto-Labeling Pipeline

Another aspect of the differentiable SDF renderer is the rendering function. To generate a final rendering, these configurations employ a function that composes layers of 2D-projected disks onto an image plane. This can include combining colors from different point primitives based on their depth values. The closer the primitive is to the camera, the stronger its contribution. These configurations use softmax to ensure that all primitive contributions sum up to 1 at each pixel. More specifically, the rendering function is $\mathcal{J}=\Sigma_i \text{NOCS}(p_i)^* w_i$, where $\mathcal{J}$ is the resulting image, NOCS returns coordinate coloring, and the wi are the weighting masks that define the contribution of each disk:

$$w_i = \frac{\exp(-\tilde{D}_i \sigma)M_i}{\Sigma_j \exp(-\tilde{D}_i \sigma)M_j},$$

where $\tilde{D}$ is the normalized depth, and $\sigma$ is a transparency constant with $\sigma \to \infty$ being completely opaque as only the closest primitive is rendered. The foregoing formulation enables gradient flow from pixels to surface points and allows image-based optimization. The foregoing optimization functions following the initialization phase can be carried out by the object-seed refinement module 314.

3D Object Detection

One underlying principle of the auto-labeling approach in these configurations is to exploit weak labels and strong differentiable priors to recover labels of higher complexity. While this idea has wide applicability, these configurations focus specifically on cuboid auto-labeling of driving scenes. As discussed above in connection with FIGS. 3 and 4, the 3D auto-labeling module 316 can run multiple loops (iterations) of the 3D auto-labeling pipeline 400 during a training phase. In the first training loop, the CSS label pool 460 includes entirely synthetic labels, and the CSS network 430 (e.g., trained CSS network) is not yet well adapted to real imagery. The results can be noisy NOCS predictions that are reliable only for well-behaved object instances in the scene.

In one aspect of the present disclosure, the vehicle perception module 310 directs a predetermined training curriculum in which the CSS network 430 is first exposed to easy annotations, and the vehicle perception module 310 increases the difficulty over subsequent training loops. In these configurations, the difficulty of an annotation can be defined by measuring the pixel sizes of the 2D label, the amount of intersection with other 2D labels, and whether the 2D label touches the border of the image (often indicating object truncation). The vehicle perception module 310 includes thresholds for these criteria to define a curriculum of increasing difficulty.

For example, the CSS network 430 is derived from a ResNet18 backbone and follows an encoder-decoder structure, processing 128×128 input patches to output a NOCS map of the same size and a 3D shape vector. Additional details regarding the structure of the CSS network 430 are provided below in connection with the discussion of FIG. 8. Before the first annotation loop, the vehicle perception module 310 trains the CSS Network 430 to infer 2D NOCS maps and shape vectors from patches. As mentioned above, such a mapping can be bootstrapped from the synthetic input data.

Figure 6:
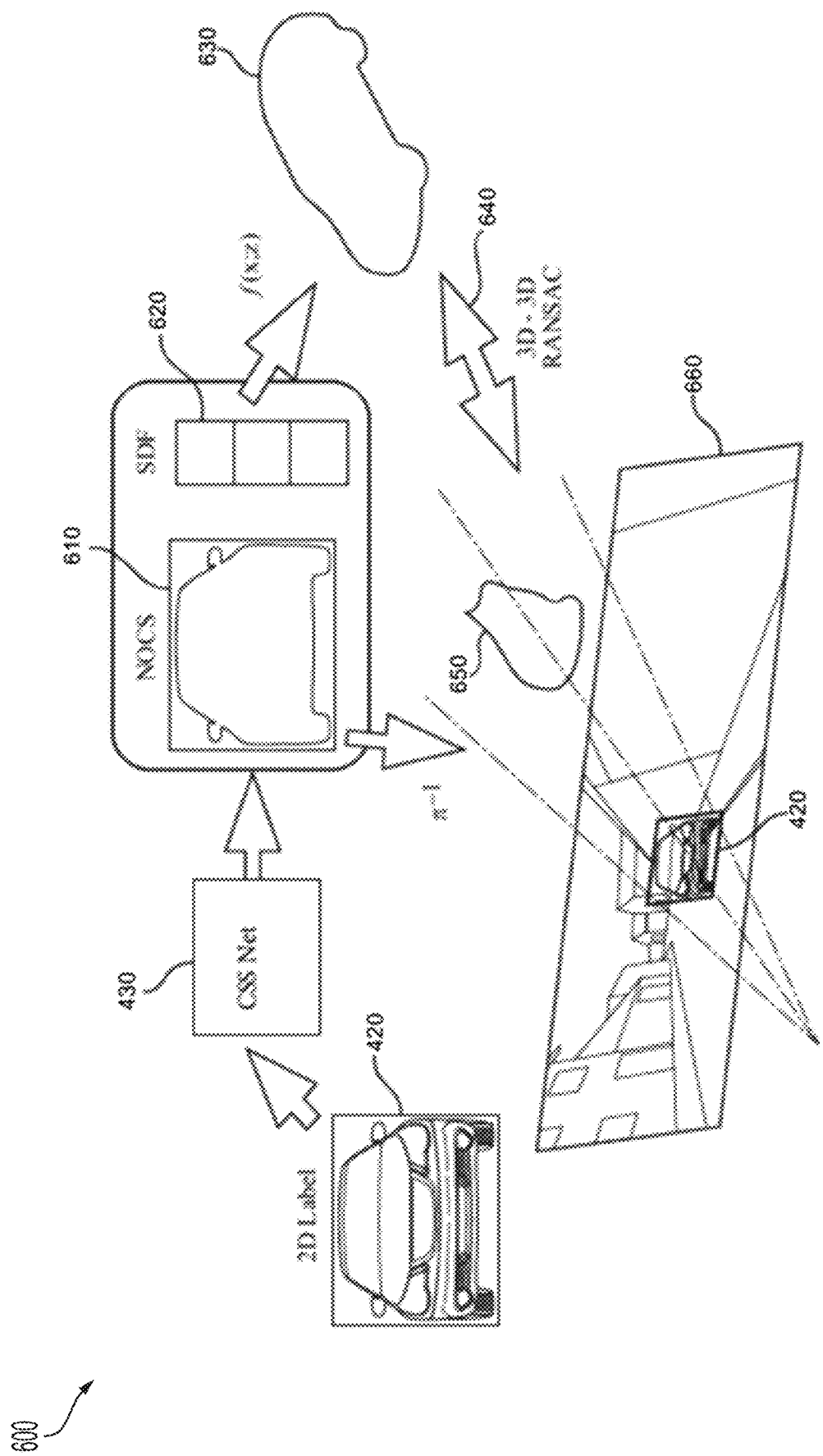
FIG. 6 is a diagram of the initialization portion of a 3D auto-labeling pipeline for the 3D auto-labeling system of FIG. 3, according to aspects of the present disclosure.

FIG. 6 is a diagram of the initialization portion of a 3D auto-labeling pipeline 600 for the 3D auto-labeling system 300 of FIG. 3, in accordance with an illustrative configuration of the present disclosure. For a given image patch (see the image patch from input image 660 bounded by 2D label 420 in FIG. 6), the vehicle perception module 310, using the CSS Network 430, infers 2D NOCS map $\mathcal{M}$ (610) and shape vector z (620). The vehicle perception module 310 decodes z into an SDF and retrieves the 3D surface points $p=\{p_1, \ldots, p_N\}$ of the object model 630 in its local frame, and computes the NOCS coordinates $p^c=\{p_i^c, \ldots, p_n^c\}$. The vehicle perception module 310 also projects the 3D LIDAR points $l=\{l_1, \ldots, l_k\}$ (650) contained inside the frustum onto the patch and collects the corresponding NOCS coordinates $l^c$.

To estimate an initial pose and scale, in this configuration, the vehicle perception module 310 establishes 3D-3D correspondences between p and l to estimate an initial affine transformation between the points l of the LIDAR point cloud and the points p of the object model. To do so, the vehicle perception module 310 finds, for each $p_i$, its nearest neighbor from NOCS distances: $j^*=\mathrm{argmin}_j\|p_i^c - l_j^c\|$ and keeps the result if $\|p_i^c - l_j^c\| < 0.2$. Finally, the vehicle perception module 310 can run a process known in the literature as Procrustes in conjunction with a random sample consensus (RANSAC) algorithm to estimate pose (R,t) and scale s. These operations are represented by 3D-3D RANSAC 640 in FIG. 6.

At this point, the vehicle perception module 310 can begin differentiable optimization over complementary 2D and 3D evidence. While projective 2D information provides strong cues for orientation and shape, 3D points allow reasoning over scale and translation. At each iteration, the vehicle perception module 310 decodes the current shape vector estimate $\tilde{z}$, extracts surface points $p_i$ and transforms them with the current estimates for pose and scale: $\hat{p}_i=(\hat{R}\cdot\hat{s})\cdot p_i+\hat{t}$. This process results in a refined or optimized affine transformation between the points l of the LIDAR point cloud and the points p of the object model.

Given the surface-model points in the scene frame, the individual 2D and 3D losses are computed as follows. For the 2D loss, optimization process 440 employs the differentiable SDF renderer discussed above to produce a rendering $\mathcal{R}$ for which maximum alignment with $\mathcal{M}$ is sought. Because the predicted $\mathcal{M}$ can be noisy (especially during the first training loop), minimizing dissimilarity ($\min\|\mathcal{M} - \mathcal{R}\|$) can yield unsatisfactory solutions. Instead, the optimization process 440 determines, for each rendered spatial pixel $r_i$ in $\mathcal{R}$ the closest NOCS-space neighbor in $\mathcal{M}$, named $m_j$, and sets them in correspondence if their NOCS distance is below a threshold. To allow gradient flow, the object-seed refinement module 314 uses their spatial indices to resample the image locally. The loss is then the mean distance over all such correspondences $C_{2D}$ in NOCS space:

$$\mathrm{loss}_{2D} = \frac{1}{|C_{2D}|}\Sigma(i, j) \in C_{2D} \|\mathcal{R}(r_i) - M(m_i)\|.$$

For the 3D loss, for each $\hat{p}_i$, the vehicle perception module 310 determines the nearest neighbor from l and keeps it if it is closer than 0.25 m. Because the vehicle perception module 310 generally produces good initializations, outliers in the optimization can be avoided through the use of a tight threshold. The 3D loss is the mean distance over all correspondences $C_{3D}$:

$$\mathrm{loss}_{3D} = \frac{1}{|C_{3D}|}\Sigma(i, j) \in C_{3D} \|\hat{p}_i - l_j\|.$$

Altogether, the final criterion is the sum of both losses, in these configurations: $\mathrm{loss}=\mathrm{loss}_{2D}+\mathrm{loss}_{3D}$. In these configurations, the terms are not balanced (e.g., weighted) because both loss terms work with similar magnitudes. Although described with reference to 2D and 3D losses, additional losses include losses from structural and physical constraints. For example, the object-seed refinement module 314 is configured to access a vehicle shape prior information regarding road and physical boundaries. In this example, the object-seed refinement module 314 is configured to adjust the linking of the 3D object vehicles over time by applying the road and physical boundaries to the trajectories, which may be optimized based on additional losses from the imposed structural and physical constraints.

Referring again to the auto-label verification process 450 in FIG. 4, the optimization framework may lead to incorrect results at times, resulting in a reduction of the influence of incorrectly-inferred auto-labels. To that end, in these configurations, the object-seed refinement module 314 enforces geometrical and projective verification to remove the worst auto-labels (e.g., cuboids). The object-seed refinement module 314 measures the number of LIDAR points that are in a narrow band (0.2 m) around the surface of the auto-label and rejects it if fewer than 60% are outside this band. Furthermore, the object-seed refinement module 314 defines a projective constraint in which auto-labels are rejected if the rendered mask's Intersection Over Union (IoU) with the provided 2D label falls below 70%.

In these configurations, the auto-labels that survive auto-label verification process 450 are harvested and added to the CSS label pool 460. After the first training loop, there is a mixture of synthetic and real samples, in subsequent training loops, that are used to retrain the CSS Network 430. Over multiple self-improving training loops, the CSS network 430 is retrained, leading to better initializations and more accurate auto-labels.

Figure 7:
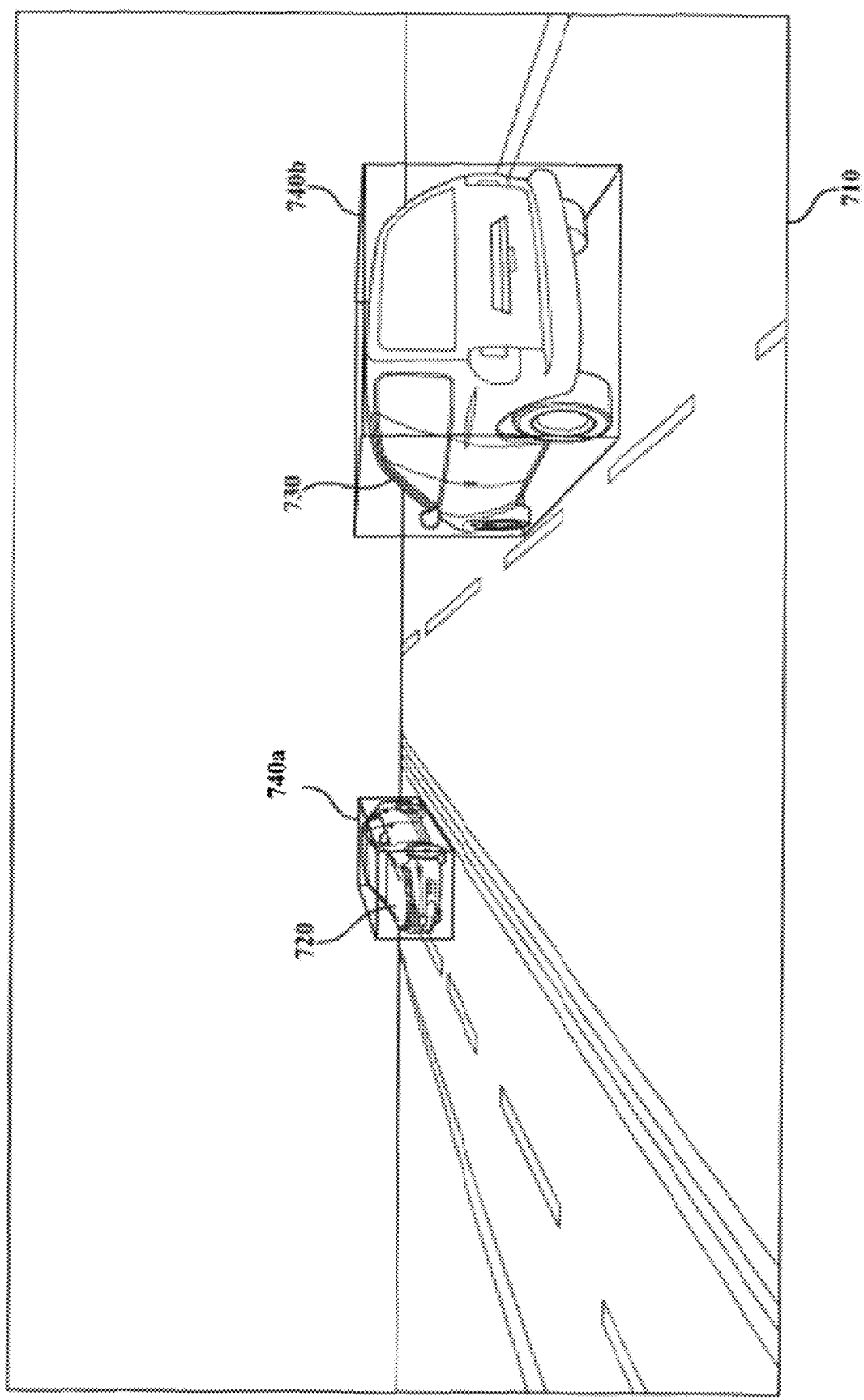
FIG. 7 shows examples of 3D labels output by a 3D auto-labeling pipeline for the 3D auto-labeling system of FIG. 3, in accordance with an illustrative configuration of the present disclosure.

FIG. 7 shows examples of 3D labels output by a 3D auto-labeling pipeline 400 of FIG. 4 for the 3D auto-labeling system 300 of FIG. 3, in accordance with an illustrative configuration of the present disclosure. The scene depicted in input image 710 includes an object 720 (a vehicle) and an object 730 (another vehicle). In this example, the 3D auto-labeling module 316 has extracted 3D label 740a for the object 720 and the 3D label 740b for the object 730. FIG. 7 illustrates that the 3D labels output to a 3D object detector (e.g., object-seed detection module 312 and object-seed refinement module 314) are cuboids (e.g., 3D bounding boxes), in this configuration.

3D Object Detection

Figure 8:
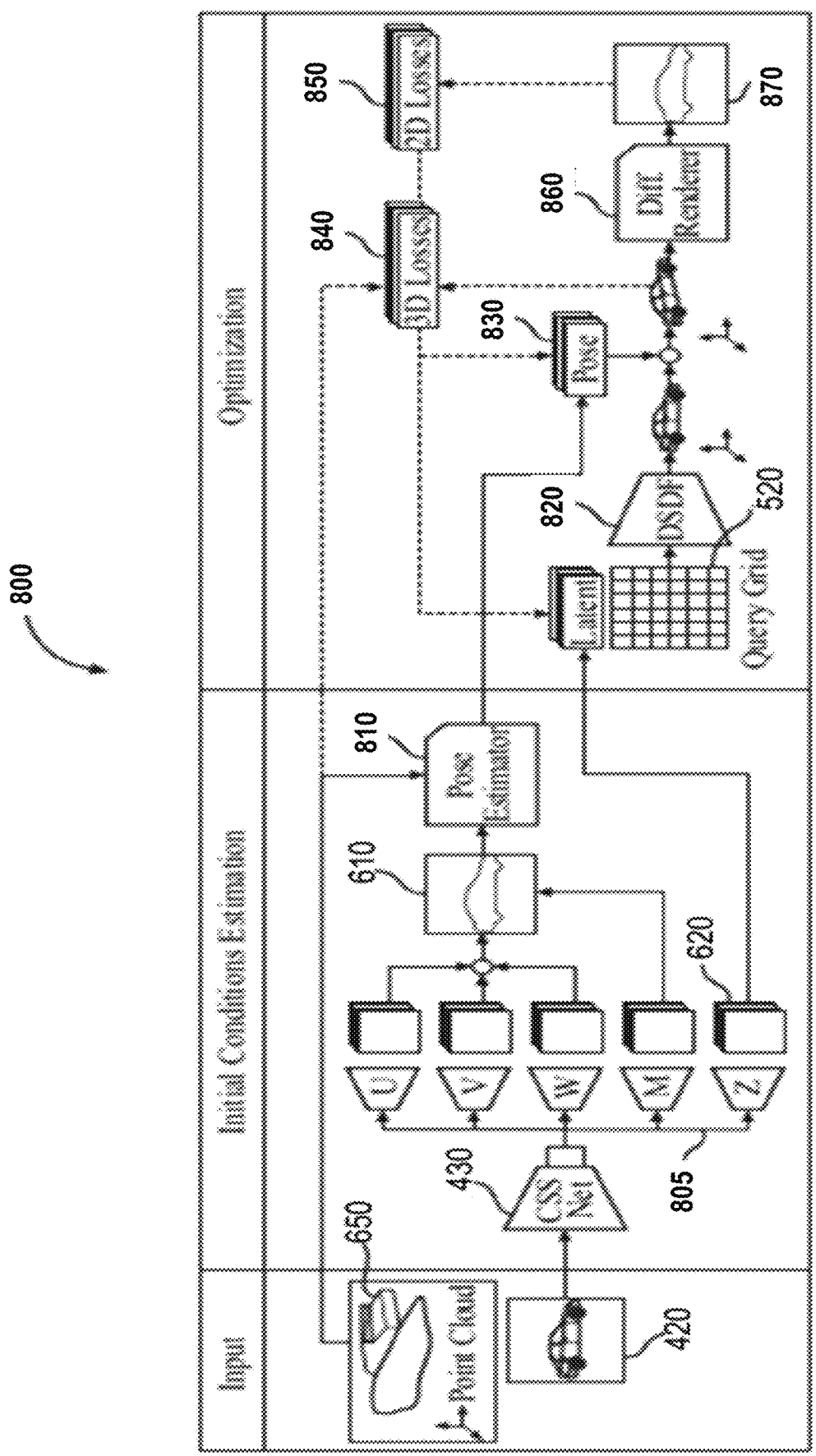
FIG. 8 illustrates a system architecture of a 3D auto-labeling pipeline for the 3D auto-labeling system of FIG. 3, according to aspects of the present disclosure.

In these configurations, 3D cuboid auto-labels are not the final goal but rather a means to an end—namely, 3D object detection. As those skilled in the art are aware, once the 3D auto-labeling module 316 has automatically extracted a 3D label (e.g., a cuboid) for an object, it is a relatively simple matter for the vehicle perception module 310 to perform 3D object detection of the object based, at least in part, on the extracted 3D label for the object. In aspects of the present disclosure, the vehicle trajectory module 318 is trained to plan a trajectory of an ego vehicle according to linked trajectories of auto-labeled 3D object vehicles while respecting road and physical boundaries Additional Implementation Details Regarding Pipeline Components FIG. 8 illustrates a system architecture of a 3D auto-labeling pipeline 800 for the 3D auto-labeling system 300 of FIG. 3, in accordance with an illustrative configuration of the present disclosure. As mentioned above, in these configurations, the CSS Network 430 includes a ResNet18 backbone architecture. In these configurations, the decoders use bilinear interpolation as an upsampling operation rather than deconvolution to decrease the number of parameters and the number of computations. Each upsampling is followed by concatenation of the output feature map with the feature map from the previous level and one convolutional layer. Because the CSS network 430 is trained on synthetic input data, it can be initialized with ImageNet weights, and the first five layers are frozen to prevent overfitting to peculiarities of the rendered data. In this configuration, five heads 805 of CSS network 430 are responsible for the output of U, V, and W channels of the NOCS, as well as the object's mask (610) and its latent vector (e.g., shape vector 620), encoding its DeepSDF shape.

The pose estimation block 810 is based on a 3D-3D correspondence estimation. In one aspect of the present disclosure, a procedure is defined as follows: the CSS network 430 outputs NOCS, mapping each RGB pixel to a 3D location on the object's surface. The NOCS are back-projected onto the LIDAR frustum points 650 using the provided camera parameters. Additionally, CSS network 430 outputs a latent vector (e.g., shape vector 620), which is then fed to the DeepSDF network 820 (DSDF) and transformed to a surface point cloud using a 0-isosurface projection, as discussed above. Because the DeepSDF network 820 is trained to output normalized models placed at the origin, each point on the resulting model surface represents NOCS. At this point, the system is ready to proceed with pose estimation.

The NOCS are used to establish correspondences between frustum points and model points. Back-projected frustum NOCS are compared to the predicted model coordinates, and nearest neighbors for each frustum point are estimated. The RANSAC can be used for robust outlier rejection. At each iteration, four random points (n) are selected from the set of correspondences and fed to the Procrustes algorithm, providing initial estimates for the pose and scale of the model (i.e., an initial estimate of an affine transformation). In these configurations, the following RANSAC parameters can be used: the number of iterations k is based on a standard function of the desired probability of success p using a theoretical result:

$$k = \frac{\log(1-p)}{\log(1-w^n)},$$

where w is the inlier probability and n represents the independently selected data points. In one configuration, p=0.9 and w=0.7.

In these configurations, a threshold of 0.2 m is used to estimate the inliers and choose the best fit. The final pose and scale of the initial affine transformation discussed above are computed based on the inliers of the best fit.

Given the output of CSS network 430 and pose initialization, optimization process 440 proceeds with the optimization stage (refer once again to FIG. 8). By concatenating the latent vector z (620) with the 3D query grid x (520), the input is formed for the DeepSDF network 820. The DeepSDF network 820 outputs SDF values for each query point on the query grid 520, which are used for the 0-isosurface projection, providing a dense surface-point cloud. The resulting point cloud is then transformed using the estimated pose and scale coming from the pose estimation block 810. The points that are not visible from the given camera view can be filtered using simple back-face culling, because surface normals have already been computed for the 0-isosurface projection. At this stage, the vehicle perception module 310 can apply 3D losses between the resulting transformed point cloud and the input LIDAR frustum points. The surface point cloud is also used as an input to the differentiable renderer 860, which renders NOCS as RGB and applies 2D losses between the NOCS prediction of the CSS network 430 and the output NOCS of the differentiable renderer 860. The latent vector (e.g., shape vector 620) and the pose 830 are then updated, and the process is repeated until termination.

The 3D losses discussed above support obtaining a precise pose/shape alignment with the frustum points. In some cases, however, a few points are available, resulting in poor alignment results. The 2D losses, on the other hand, enable precise alignment in the screen space over dense pixels but are generally unsuitable for 3D scale and translation optimization and rely heavily on their initial estimates. The combination of the two losses (2D and 3D) provides the best of both worlds: dense 2D alignment and robust scale/translation estimation.

Figure 9:
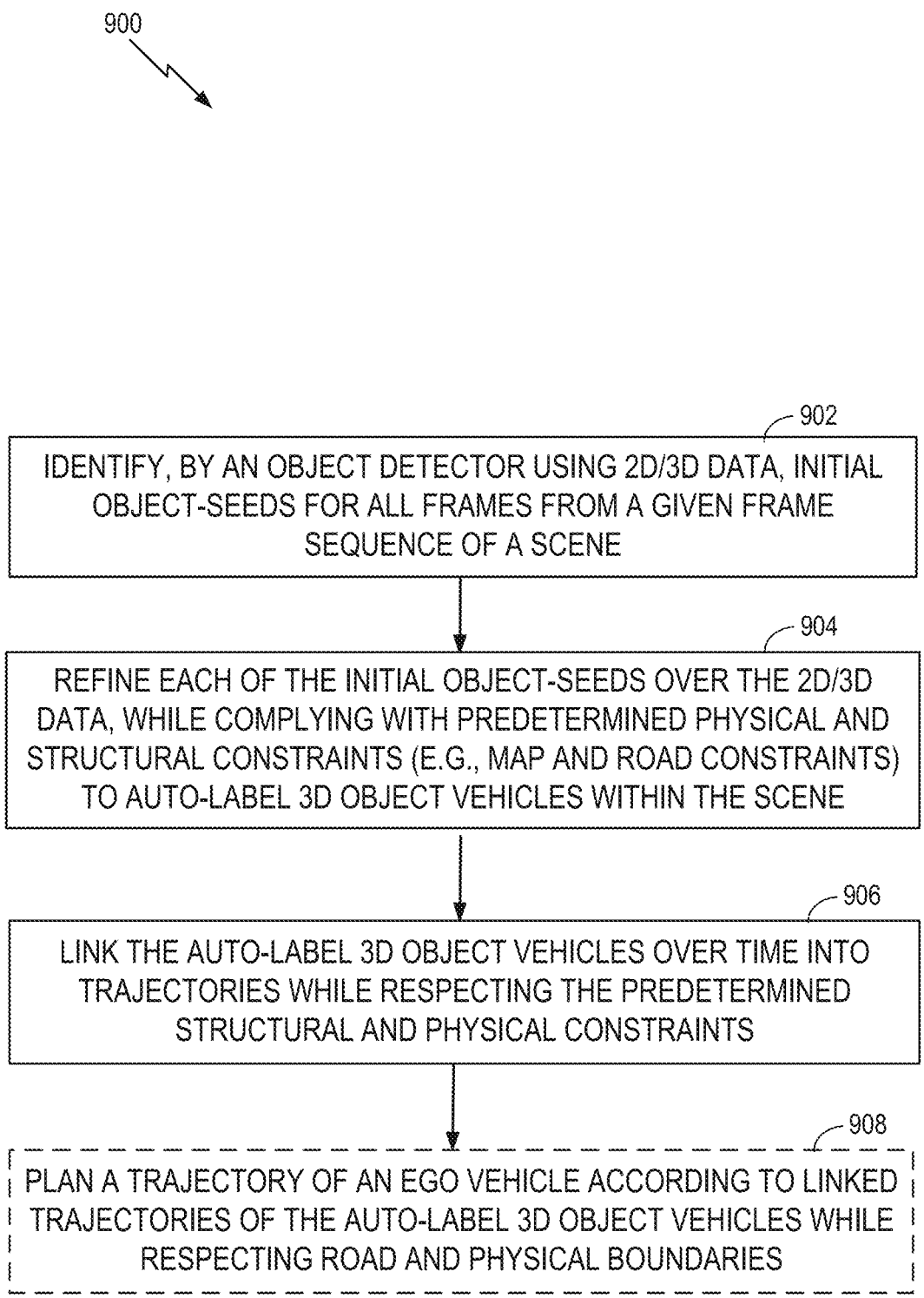
FIG. 9 is a flowchart illustrating a method of 3D auto-labeling of objects with structural and physical constraints, according to aspects of the present disclosure.

FIG. 9 is a flowchart illustrating a method for 3D auto-labeling of objects with structural and physical constraints, according to aspects of the present disclosure. The method 900 begins at block 902, in which an object detector, using 2D/3D data, identifies initial object-seeds for all frames from a given frame sequence of a scene. For example, as shown in FIG. 3, the object-seed detection module 312 is trained to identify initial object-seeds for all frames from a given frame sequence of a scene from the sensor module 302. For example, the object-seeds are objects that may be vehicles, but are also non-vehicle objects, as shown in FIG. 4.

At block 904, each of the initial object-seeds is refined over the 2D/3D data, while complying with predetermined physical and structural constraints to auto-label 3D object vehicles within the scene. For example, as shown in FIG. 3, the object-seed refinement module 314 is trained to refine the initial object-seeds from the object-seed detection module 312 by applying predetermined shape prior information (e.g., map and road constraints). Once identified, an optimization procedure of the object-seed refinement module improves each initial object-seed over the 2D/3D information, while respecting map and road constraints. This portion of the method 900 involves shape prior. In this portion of the method 900, the additional shape prior information (e.g., vehicle should have wheels, must be located on the ground, and does not penetrate another) are applied to constrain the 3D object detection and enable the 3D auto-labeling module 316 to auto-label 3D object vehicles in a scene, as shown in FIG. 4.

At block 906, the auto-label 3D object vehicles are linked over time into trajectories while respecting the predetermined structural and physical constraints. For example, as shown in FIG. 3, the vehicle trajectory module 318 is trained to link the the auto-label 3D object vehicles over time into trajectories while complying with the predetermined structural and physical constraints. The method 900 also includes accessing vehicle shape prior information regarding road and physical boundaries. The method 900 further includes adjusting the linking of the 3D object vehicles over time by applying the road and physical boundaries to the trajectories. This enables the method 900 to link the auto-label 3D object vehicles of block 906.

At block 908, a trajectory of an ego vehicle is planned according to linked trajectories of the auto-label 3D object vehicles while respecting road and physical boundaries. For example, as shown in FIG. 3, the vehicle trajectory module 318 is configured to plan a trajectory of an ego vehicle (e.g., car 350), according to linked trajectories of the auto-label 3D object vehicles while respecting road and physical boundaries. In addition, the controller module 340 is configured to select vehicle control actions (e.g., acceleration, braking, steering, etc.). The method 900 further includes performing three-dimensional object detection of the auto-label 3D vehicle objects within the scene. The method 900 also includes performing three-dimensional pose detection of the auto-label 3D vehicle objects within the scene.

In some aspects of the present disclosure, the method 900 may be performed by the SOC 100 (FIG. 1) or the software architecture 200 (FIG. 2) of the ego vehicle 150 (FIG. 1). That is, each of the elements of method 900 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more PGAs, PLDs, controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for 3D auto-labeling of objects with predetermined structural and physical constraints, comprising:
    identifying initial object-seeds for all frames from a given frame sequence of a scene;
    refining each of the initial object-seeds over the 2D/3D data, while complying with the predetermined structural and physical constraints to auto-label 3D object vehicles within the scene by discarding incorrect auto-labels of the initial object-seeds when the initial object-seeds are identified as contradicting a first vehicle shape prior information; and
    linking the auto-label 3D object vehicles over time into trajectories while respecting the predetermined structural and physical constraints by adjusting the linking of the 3D object vehicles over time by applying a second vehicle shape prior information regarding road and physical boundaries to the trajectories.

2. The method of claim 1, further comprising planning a trajectory of an ego vehicle according to linked trajectories of the auto-label 3D object vehicles while respecting road and physical boundaries.

3. The method of claim 1, in which identifying the initial object-seeds is performed by a vehicle perception module using 2D/3D data.

4. The method of claim 1, in which refining the initial object-seeds comprises:
    accessing a vehicle shape prior information; and
    discarding incorrect auto-labels of the initial object-seeds when the initial object-seeds are identified as contradicting the vehicle shape prior information.

5. The method of claim 1, in which linking the auto-label 3D object vehicles comprises:
    accessing a vehicle shape prior information regarding road and physical boundaries; and
    adjusting the linking of the 3D object vehicles over time by applying the road and physical boundaries to the trajectories.

6. The method of claim 1, further comprising planning a trajectory of an ego vehicle according to perception of the scene from video captured by the ego vehicle.

7. The method of claim 1, further comprising performing three-dimensional object detection of the auto-label 3D vehicle objects within the scene.

8. The method of claim 1, further comprising performing three-dimensional pose detection of the auto-label 3D vehicle objects within the scene.

9. A non-transitory computer-readable medium having program code recorded thereon for 3D auto-labeling of objects with predetermined structural and physical constraints, the program code being executed by a processor and comprising:
    program code to identify initial object-seeds for all frames from a given frame sequence of a scene;
    program code to refine each of the initial object-seeds over the 2D/3D data, while complying with the predetermined structural and physical constraints to auto-label 3D object vehicles within the scene by program code to discard incorrect auto-labels of the initial object-seeds when the initial object-seeds are identified as contradicting a first vehicle shape prior information; and
    program code to link the auto-label 3D object vehicles over time into trajectories while respecting the predetermined structural and physical constraints by program code to adjust the linking of the 3D object vehicles over time by applying a second vehicle shape prior information regarding road and physical boundaries to the trajectories.

10. The non-transitory computer-readable medium of claim 9, further comprising program code to plan a trajectory of an ego vehicle according to linked trajectories of the auto-label 3D object vehicles while respecting road and physical boundaries.

11. The non-transitory computer-readable medium of claim 9, in which the program code to identify the initial object-seeds is performed by a vehicle perception module using 2D/3D data.

12. The non-transitory computer-readable medium of claim 9, in which the program code to refine the initial object-seeds comprises:
    program code to access a vehicle shape prior information; and
    program code to discard incorrect auto-labels of the initial object-seeds when the initial object-seeds are identified as contradicting the vehicle shape prior information.

13. The non-transitory computer-readable medium of claim 9, in which program code to link the auto-label 3D object vehicles comprises:
    program code to access a vehicle shape prior information regarding road and physical boundaries; and
    program code to adjust the linking of the 3D object vehicles over time by applying the road and physical boundaries to the trajectories.

14. The non-transitory computer-readable medium of claim 9, further comprising program code to plan a trajectory of an ego vehicle according to perception of the scene from video captured by the ego vehicle.

15. The non-transitory computer-readable medium of claim 9, further comprising program code to perform three-dimensional object detection of the auto-label 3D vehicle objects within the scene.

16. The non-transitory computer-readable medium of claim 9, further comprising program code to perform three-dimensional pose detection of the auto-label 3D vehicle objects within the scene.

17. A system for 3D auto-labeling of objects with predetermined structural and physical constraints, the system comprising:
    an object-seed detection module trained to identify initial object-seeds for all frames from a given frame sequence of a scene;
    an object-seed refinement module trained to refine each of the initial object-seeds over the 2D/3D data, while complying with the predetermined structural and physical constraints to auto-label 3D object vehicles within the scene by discarding incorrect auto-labels of the initial object-seeds when the initial object-seeds are identified as contradicting a first vehicle shape prior information; and a 3D auto-labeling module trained to link the auto-label 3D object vehicles over time into trajectories while respecting the predetermined structural and physical constraints by adjusting the linking of the 3D object vehicles over time by applying a second vehicle shape prior information regarding road and physical boundaries to the trajectories.

18. The system of claim 17, further comprising a vehicle trajectory module trained to plan a trajectory of an ego vehicle according to linked trajectories of the auto-label 3D object vehicles while respecting road and physical boundaries.

19. The system of claim 17, further comprising a vehicle perception module trained to identify the initial object-seeds is performed using 2D/3D data.

20. The system of claim 17, in which the object-seed refinement module is further trained:
to access a vehicle shape prior information; and
to discard incorrect auto-labels of the initial object-seeds when the initial object-seeds are identified as contradicting the vehicle shape prior information.

* * * * *